M. J. STEELE.
DISPENSING CONTAINER.
APPLICATION FILED JULY 26, 1920.
1,396,469.
Patented Nov. 8, 1921.
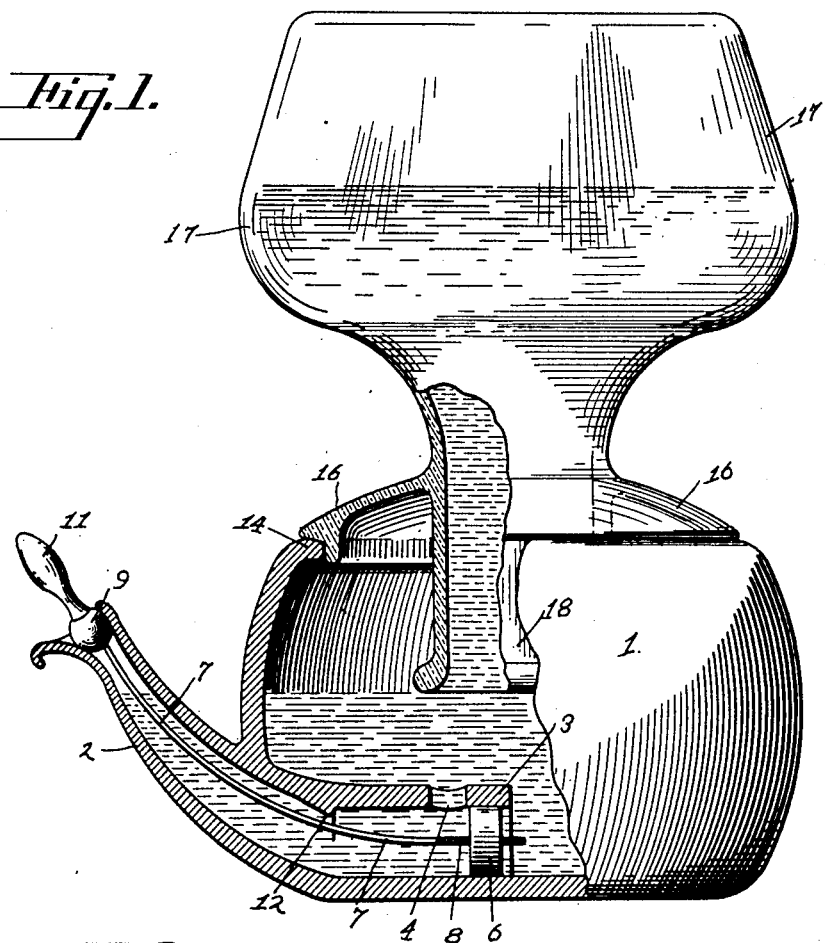
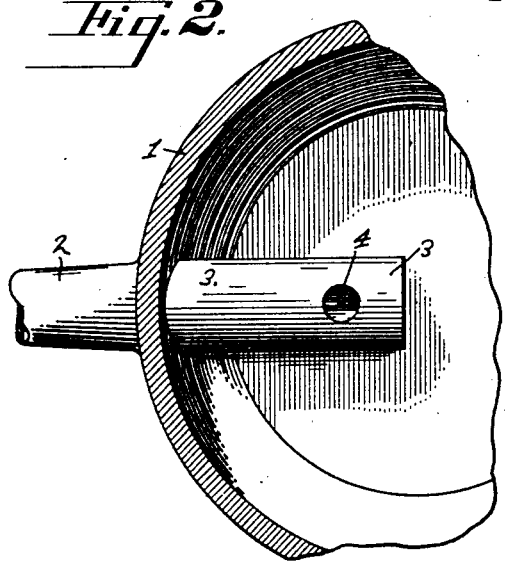
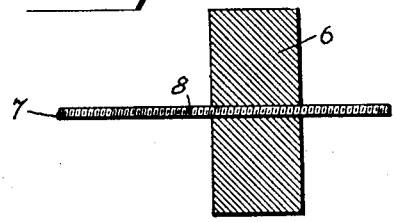
Inventor
Mary J. Steele
By Arthur L. Slee
Atty.

UNITED STATES PATENT OFFICE.

MARY J. STEELE, OF SAN FRANCISCO, CALIFORNIA.

DISPENSING-CONTAINER.

1,396,469.  Specification of Letters Patent.  Patented Nov. 8, 1921.

Application filed July 26, 1920. Serial No. 398,896.

*To all whom it may concern:*

Be it known that I, MARY J. STEELE, a citizen of the United States, residing in the city and county of San Francisco and State of California, have invented a certain new and useful Improvement in a Dispensing-Container, of which the following is a specification.

My invention relates to improvements in dispensing containers wherein a plunger is reciprocated within an inwardly extending portion of a spout to dispense uniform quantities of fluid from the container.

The primary object of my invention is to provide an improved dispensing container arranged to deliver uniform quantities of fluid therefrom.

Another object is to provide a dispensing container of cheap and durable construction.

A further object is to provide an improved device of the character described wherein the quantity of fluid dispensed at each operation of the dispensing means may be regulated.

A still further object is to provide a dispensing container arranged to deliver uniform quantities of fluid with means for maintaining a constant level of fluid within the container.

I accomplish these and other objects hereinafter appearing by means of the novel device disclosed in the drawings forming a part of the present specification wherein like characters of reference are used to designate similar parts throughout said specification and drawings and in which:

Figure 1 is a side elevation of my improved dispensing container, portions being shown in section to disclose the dispensing means.

Fig. 2 is a broken horizontal section disclosing the apertured spout extension within the container.

Fig. 3 is a sectional view of the plunger on a larger scale, disclosing the adjustable connection with the operating rod.

Referring to the drawings, the numeral 1 is used to designate a container having a spout 2 arranged with a cylindrical extension 3 formed within the container 1 and having an aperture 4 in the upper side thereof through which fluid from the container 1 is admitted to the spout extension 3.

A plunger 6 is slidably mounted within the extension 2, said plunger 6 being adjustably mounted upon an operating rod 7 by means of threads 8 whereby the plunger may be advanced or receded along the operating rod for a purpose hereinafter more fully explained.

The operating rod 7 is made of a semi-flexible material such as piano-wire or the like in order to conform to the curvature of the spout 2 when the plunger 6 is reciprocated. The flexibility further permits adjustment of the plunger 6 by rotation of the rod 7, thereby facilitating adjustment. The operating rod 7 extends outwardly through the spout and is provided at the outer end with a ball 9 provided with a handle 11, whereby the plunger may be manually operated. The ball 9 is arranged to engage the mouth of the spout 2 and close the same when the plunger 6 is moved inwardly to its receded position.

The forward movement of the plunger 6 is limited by a buffer 12 formed within the spout extension 3.

The container 1 is open at the upper portion and provided with an inwardly turned edge 14 adapted to engage the edge of an annular flange 16 formed upon a storage container 17 arranged to be positioned in an inverted position upon the container 1 as disclosed in Fig. 1 of the drawings. The storage container 17 is provided with a neck 18 arranged to extend downwardly into the container 1 to the point at which it is desired to maintain the level of a fluid to be dispensed therefrom.

My invention is primarily designed for use by confectioners and the like for dispensing relatively small quantities of syrups for flavoring ices and the like. In the following description the device will be considered as operated in this connection, although obviously the utility of my invention is not confined to this specific application.

In operation the storage container 17 filled with the syrup or other fluid to be dispensed is placed in inverted position upon the dispensing container 1, the syrup flowing into the container 1 until the surface of the fluid reaches the opening in the neck 18 of the storage container. The plunger 6, which is normally caused to assume the receded position with the mouth of the spout closed by the ball 9, is now advanced by pulling the rod 7 outwardly by means of the handle 11. In this manner, syrup which has been admitted to the spout extension, or plunger chamber 3 through the aperture 4 is forced outwardly through the nozzle 2 and received in any manner desired. The forward movement of the plunger 6 is limited by the buffer 12. As for any adjustment upon the rod 7, the plunger 6 is receded to the same point in closing the spout, it is obvious that a uniform quantity of the fluid will be dispensed at each operation of the plunger. If the quantity of syrup dispensed is to be changed, it is necessary only to rotate the operating rod 7 by means of the handle 11, thereby advancing or receding the plunger to the desired position upon the threaded portion of the rod 7 to cause a greater or lesser displacement of the plunger when reciprocated. The level of the fluid is constantly maintained at the same level in the dispensing container 1 and spout 2 until the syrup is exhausted from the storage container 17, sufficient syrup being supplied therefrom to replace that removed at each operation of the plunger.

The flange 16 of the storage container 17 is made cup shaped in order to catch and retain any fluid that may be spilled in refilling the container and direct such fluid into the dispensing container 1 when inverted thereover.

The dispensing container 1 is made of pottery thereby making a cheap and durable container. The simplicity of the dispensing elements with the elimination of all springs, valves and other intricate members cheapens the cost of manufacture without detracting from the efficiency of the device in dispensing any fluid product. The storage container may best be made of transparent glass thereby adding attractiveness to the device by the display of color, and permitting the operator to observe the supply of syrup in order to refill when the quantity has been reduced.

The containers may be made of any artistic design thereby obtaining an ornamental display in addition to the simplicity and efficiency in operation of the dispensing means.

Having thus described my invention what I claim as new and desire to secure by Letters Patent is:

1. A dispensing device comprising a container provided with a spout having an extension within the container, said extension having an aperture to admit fluid from the container; means for maintaining a constant level of fluid within the container; a plunger slidably mounted within said extension; and an operating rod adjustably secured to said plunger and extending outwardly through the spout to dispense fluid through said spout; and means mounted upon the outer end of said operating rod arranged to close the mouth of the spout when the plunger is in the receded position.

2. A dispensing device comprising a container provided with a spout having an extension within the container, said extension having an aperture to admit fluid from the container; means for maintaining a constant level of fluid within the container; a plunger slidably mounted within said extension; and an operating rod adjustably secured to said plunger and extending outwardly through the spout to dispense fluid through said spout; and a ball provided with a handle mounted upon the outer end of said operating rod and arranged to close the mouth of the spout when the plunger is moved to the receded position.

3. A dispensing device comprising a container; means for maintaining a constant level of fluid within said container; a spout formed upon said container having the outer end thereof above the fluid level of the container, and having an extension within the container below said fluid level; and means mounted within the spout for dispensing uniform quantities of fluid from the container through said spout.

4. A dispensing device comprising a dispensing container open at the top thereof; a storage container having an annular flange adapted to close the open top of the dispensing container when said storage container is inverted thereon; a neck formed upon the storage container to extend downwardly to a predetermined fluid level within the dispensing container when inverted thereon to keep said dispensing container filled to said predetermined fluid level; a spout formed upon the dispensing container having the outer end thereof above the fluid level of the dispensing container, and having an extension within said container below said fluid level; and means mounted within the spout for dispensing uniform quantities of fluid from the dispensing container through said spout.

5. A dispensing device comprising a dispensing container open at the top thereof; a storage container arranged to be inverted upon said dispensing container, said storage container being provided with a cup shaped annular flange to close the open top of the dispensing container and to support the storage container thereabove; a neck formed upon the storage container and extending downwardly into the dispensing container to a predetermined fluid level therein when said storage container is placed in inverted position upon said dispensing container to keep same filled to said predetermined fluid level; a spout formed upon the dispensing container having the outer end opening above the fluid level, and having an extension within said container below said fluid level; and means mounted within the spout for dispensing uniform quantities of fluid from the dispensing container through said spout.

MARY J. STEELE.